United States Patent
Ogawa et al.

(10) Patent No.: US 6,340,396 B1
(45) Date of Patent: Jan. 22, 2002

(54) FLUX CORED WIRE FOR WELDING DUPLEX STAINLESS STEEL

(75) Inventors: Tsuneshi Ogawa; Toshiharu Maruyama; Haruya Kozuki; Shintaro Ozaki, all of Fujisawa (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/391,361

(22) Filed: Sep. 8, 1999

(30) Foreign Application Priority Data

Dec. 9, 1998  (JP) .......................... 10-349657

(51) Int. Cl.$^7$ .............................. B23K 35/34
(52) U.S. Cl. ...................... 148/23; 75/304; 219/146.23
(58) Field of Search ........................... 148/23; 75/304; 219/146.1, 146.22, 146.23

(56) References Cited

U.S. PATENT DOCUMENTS

| | | |
|---|---|---|
| 5,120,931 A | 6/1992 | Kotecki et al. |
| 5,124,529 A | 6/1992 | Nishikawa et al. |
| 5,219,425 A | 6/1993 | Nishikawa et al. |
| 5,378,871 A | 1/1995 | Nishikawa et al. |
| 5,403,377 A * | 4/1995 | Masaie et al. ............... 75/304 |
| 5,854,462 A | 12/1998 | Ogawa et al. |
| 5,861,605 A | 1/1999 | Ogawa et al. |
| 5,914,061 A * | 6/1999 | Ogawa et al. ......... 219/145.22 |

FOREIGN PATENT DOCUMENTS

| | | |
|---|---|---|
| JP | 60-191693 | 9/1985 |
| JP | 9-122978 | 5/1997 |
| NL | 1004444 | 5/1997 |

OTHER PUBLICATIONS

Patent Abstracts of Japan, vol. 010, No. 037, (M–453), Feb. 14, 1986, JP 60 191693, Sep. 30, 1995.
Patent Abstracts of Japan, vol. 1995, No. 11, AN 05349694, Dec. 26, 1995, JP 07 197130, Aug. 1, 1995.
J. Hilkes, et al., Welding Journal, US, American Welding Society, vol. 74, No. 11, pp. 51–54, "Welding Duplex Stainless Steel", Nov. 1, 1995.

* cited by examiner

Primary Examiner—Roy King
Assistant Examiner—Harry D. Wilkins, III
(74) Attorney, Agent, or Firm—Oblon, Spivak, McClelland, Maier & Neustadt, P.C.

(57) ABSTRACT

A flux cored wire for welding duplex stainless steel, comprising a shell cored with a flux. The wire is good in pitting corrosion resistance and notch toughness. In the wire, the total of the shell and the flux comprises Cr, Mo and N in an amount of 21.0–26.0 wt %, 2.6–4.0 wt % and 0.08–0.30 wt %, respectively, of the total weight of the wire; the amounts of C, Bi and a metal inclusion having a melting point over 2000° C. are set up to 0.04 wt % or less, 0.015 wt %, and 0.1 wt %, respectively; the total amount of Ni powder and Fe powder is set up to 3.0 wt %; and a parameter A represented by [Cr]+3.3×[Mo]+16×[N]−150×[Bi] wherein [Cr], [Mo], [N] and [Bi] represent the contents of Cr, Mo, N and Bi, respectively, is from 33.0 to 43.0.

4 Claims, 1 Drawing Sheet

FLUX CORED WIRE FOR WELDING DUPLEX STAINLESS STEEL

BACKGROUND OF THE INVENTION

1. Field of the Invention

The present invention relates to a flux cored wire for welding duplex stainless steel, whose composition ratio of the austenite phase to the ferrite phase is 1:1, and in particular to a flux cored wire, for welding duplex stainless steel, excellent in pitting corrosion resistance, cold toughness and welding usability.

2. Prior Art

Hitherto, duplex stainless steel defined in JIS SUS 329J3L, SUS 329J4L and ASTM S31803 and the like has widely been used as construction materials for chemical plant machines, oil pipes for oil or natural gas drilling, pipelines, chemical tankers, water gates and the like because the steel has excellent stress corrosion crack resistance (SCC) and pitting corrosion resistance mainly in the environment including chlorine ions, such as seawater, and has high strength.

In many cases, for welding these materials, there is basically used a weld metal having the same alloy composition as a parent metal. Therefore, the alloy composition of the weld metal has various kinds in the same way as the parent metal. Concerning welding thereof, various kinds of methods are used. In particular, there is widely used MAG welding by means of a flux cored wire which is easy to use and exhibits high efficency.

However, the duplex stainless steel is subjected to thermal treatment after rolling in the process for producing the steel so that the microstructure of the steel is stabilized to microstructure which is similar to that in the equilibrium state at thermal treatment temperature. On the other hand, the weld metal has relatively stable microstructure in the non-equilibrium state, wherein only the ferrite phase is solidified and subsequently the austenite phase is precipitated in the ferrite phase in the step of natural cooling. For this reason, the pitting corrosion resistance and the notch toughness of the weld metal is more unstable than those of the base material. Thus, there arise problems in some construction materials to which the conventional welding consumable is applied. Thus, an improvement in the welding consumable has been demanded.

SUMMARY OF THE INVENTION

In the light of the above-mentioned problems, the present invention has been made. It is therefore an object to provide a flux coredwire, for welding duplex stainless steel, excellent in pitting corrosion resistance, cold toughness and welding usability.

The flux cored wire for welding duplex stainless steel of the present invention, comprises a shell cored with a flux, wherein the total of the shell and the flux comprises C, Cr, Mo and N in amounts of 0.04 wt % or less, 21.0–26.0 wt %, 2.6–4.0 wt % and 0.08–0.30 wt %, respectively, of the total weight of the wire; the amounts of C, Bi and a metal inclusion having a melting point over 2000° C. are set up to 0.04 wt % or less, 0.015 wt % or less, and 0.1 wt % or less, respectively; the total amount of Ni powder and Fe powder is set up to 3.0 wt % or less; and a parameter A represented by $\{Cr\}+3.3\times\{Mo\}+16\times\{N\}-150\times\{Bi\}$ wherein $\{Cr\}$, $\{Mo\}$, $\{N\}$ and $\{Bi\}$ represent the contents of Cr, Mo, N and Bi, respectively, is from 33.0 to 43.0.

In the present invention, it is preferable that the total of the shell and the flux comprises $TiO_2$, $SiO_2$, $ZrO_2$, $Al_2O_3$ and MgO in amounts of 5.0–8.0 wt %, 0.2–1.2 wt %, 1.2–3.3 wt %, 0.50 wt % or less, and 0.35 wt % or less, respectively, of the total weight of the wire; a parameter D represented by $\{Al_2O_3\}-20\times\{Bi_2O_3\}$ wherein $\{Al_2O_3\}$ and $\{Bi_2O_3\}$ represent the contents of $Al_2O_3$ and $Bi_2O_3$, respectively, is from 0 to 0.35; and the total amount of the slag forming components is from 9.0 to 13.0 wt %.

In the present invention, it is also preferable that the total of the shell and the flux comprises 1.0 wt % or less of one or more selected from the group consisting of Ti or Fe—Ti alloy: 1.0 wt % or less as a value converted to Ti; Mg alloy: 1.0 wt % or less as a value converted to Mg; and Al or Al alloy: 1.0 wt % or less as a value converted to Al.

According to the present invention, the microstructure of the weld metal is made stable and micro-segregation, which is a starting point of pitting corrosion, is reduced by specifying the contents of Cr, Mo and N, which are basic chemical components of a weld material for duplex stainless steel, into such a range that mechanical properties and welding usability of the weld metal are not damaged, specifying the contents of C and Bi in the wire, specifying the parameter A, limiting metal inclusions having a melting point over 2000° C. in metals added to the cored flux, and specifying the contents of the Ni powder and the Fe powder. In this way, it is possible to obtain the duplex stainless steel welding flux cored wire which does not damage the pitting corrosion resistance and the welding usability of the weld metal.

The duplex stainless steel welding flux cored wire having still better welding usability can be obtained by limiting the total amount of $TiO_2$, $SiO_2$, $ZrO_2$, $Al_2O_3$, MgO and slag forming components and the value of the parameter D appropriately.

The duplex stainless steel welding flux cored wire having still better notch toughness can be obtained by limiting the contents of Ti, Mg or Al appropriately.

DESCRIPTION OF THE PREFERRED EMBODIMENTS

Figure 1:
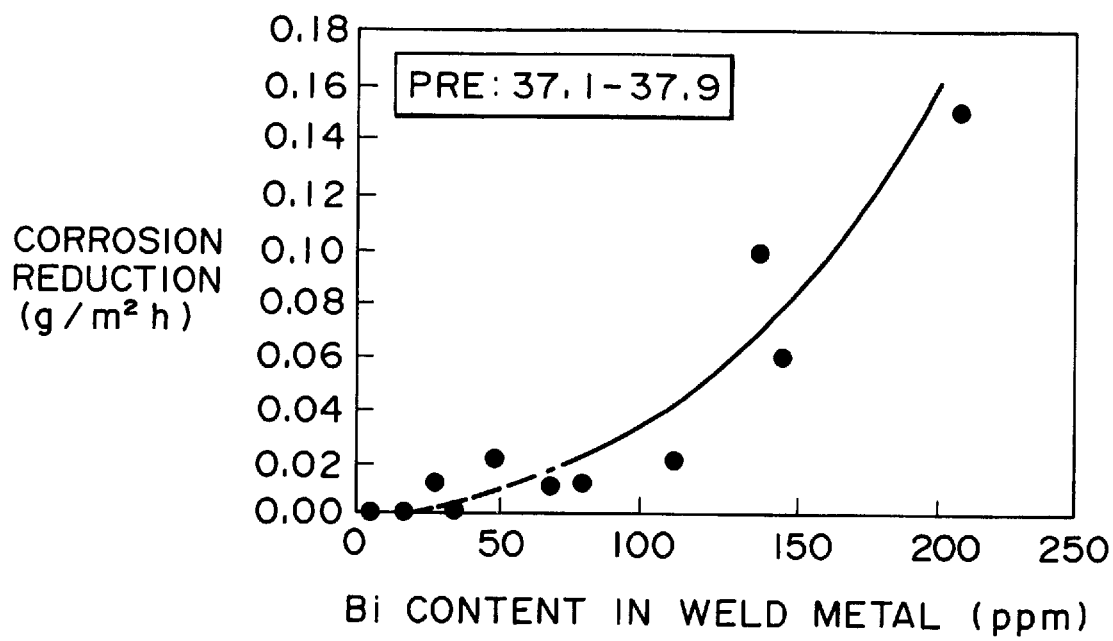
FIG. 1 is a graph showing influence of Bi on duplex stainless steel weld metal.

Embodiments of the present invention will be specifically described hereinafter. The inventors made various studies on flux cored wires for welding duplex stainless steel, in particular the correlation between chemical components of the wires and their pitting corrosion resistance and notch toughness, and the relevancy between the chemical components of the wires and their welding usability. As a result, the following findings were obtained.

As a method for improving pitting corrosion resistance, it is generally known that addition of Cr, Mo and N is effective. Japanese Patent Application Laid-Open Nos. 60-191693 and 9-122978 disclose appropriate added amounts of N and nitrogen compounds.

Thus, the inventors studied the influence of Cr, Mo and N on pitting corrosion resistance through experiments, and it became clear that the influence depended on variation in welding heat input, which was inevitably generated in welding spots. If, considering the variation in welding heat input, the added amounts of Cr, Mo and N are increased to improve pitting corrosion resistance, mechanical properties and welding usability of a weld metal are damaged. This manner is restrictive.

Thus, the inventors researched manners for improving pitting corrosion resistance under the condition that the added amounts of Cr, Mo and N were specified within such a range that mechanical properties and welding usability of the weld metal were not damaged.

As a result, the inventors have found that the microstructure of the weld metal can be made stable and microsegregation, from which pitting corrosion starts, can be reduced by specifying the amounts of C and Bi in wires, the value of the parameter A, which is equal to {Cr}+3.3×{Mo}+16×{N}−150×{Bi}, the amount of a metal inclusion which is added to the cored flux and has a melting point over 2000° C., and the total amount of Ni powder and Fe powder. This manner makes it possible to improve pitting corrosion resistance without damaging mechanical properties or weldability of the weld metal.

Slag covering and bead appearance can be improved by specifying the contents by percentage of respective components of $TiO_2$, $SiO_2$, $ZrO_2$, $Al_2O_3$ and MgO, specifying the parameter D, which is equal to $\{Al_2O_3\}-20\times\{Bi_2O_3\}$, and specifying the total amount of slag forming components, such as various kinds of metal oxides, metal fluoride, and arc stabilizers.

By specifying the contents by percentage of Ti, Mg and Al in the wire, deoxidization effect is exhibited and its microstructure is made fine so that the notch toughness of the weld metal can be improved.

On the basis of the above-mentioned findings, the flux cored wire for welding duplex stainless steel according to the present invention has been completed. The following will specifically describe reasons why, in the flux cored wire for welding duplex stainless steel according to the present invention, its components are added and its composition is limited.

Cr: 21.0–26.0% by Weight (wt %)

Cr is an element for improving pitting corrosion resistance. If the Cr content (the content by percentage of Cr) is less than 21.0 wt %, this improving effect cannot be sufficiently obtained. On the other hand, if the Cr content is more than 26.0 wt %, the sigma phase is precipitated and the wire is made brittle so that the notch toughness of the wire drops. Therefore, the Cr content is set up to 21.0–26.0 wt %.

Mo: 2.6–4.0 wt %

Mo is an element for improving pitting corrosion resistance. If the Mo content is less than 2.6 wt %, this improving effect cannot be sufficiently obtained. On the other hand, if the Mo content is more than 4.0 wt %, the sigma phase is precipitated and the wire is made brittle so that the notch toughness of the wire drops. Therefore, the Mo content is set up to 2.6–4.0 wt %.

N: 0.08–0.30 wt %

N is a solid-solution strengthening element, and has an effect of raising the strength of weld metal and improving pitting corrosion resistance. If the N content is less than 0.08 wt %, the effect cannot be sufficiently obtained. On the other hand, if the N content is more than 0.30 wt %, weld defects such as blowholes are easily generated. N is contained in either one or both of the steel shell and the cored flux. When a nitrogen compound is contained in the flux, the amount of the compound is converted to the amount of N.

C: 0.04 wt %, or Less

C is chemically combined with Cr, Mo or the like, to generate a carbide. Thus, corrosion resistance of weld metal is deteriorated and the amount of spatter is increased. Therefore, it is preferred that the C content is lower. However, the C content up to 0.04 wt % is practically allowable in the present invention. Accordingly, the C content is limited to 0.04 wt % or less.

Bi: 0.015 wt % or Less

FIG. 1 is a graph showing an influence of Bi on duplex stainless steel weld metal. PRE in FIG. 1 is a pitting index, and is a factor which influences pitting corrosion resistance. In order to make this factor substantial constant, PRE is adjusted into the range of 37.1 to 37.9. The adjustment makes it possible to judge clearly the influence of only the Bi content on pitting corrosion resistance. From FIG. 1, it is clear that Bi causes deterioration in pitting corrosion resistance of duplex stainless steel weld metal. Therefore, it is preferred that the Bi content is lower. However, the Bi content up to 0.015 wt % is practically allowable in the present invention. Accordingly, the Bi content is limited to 0.015 wt % or less. The amount of Bi defined herein is the total of the Bi amount of pure Bi and the converted Bi amount of Bi compounds such as Bi oxide, Bi fluoride, Bi sulfide, Bi hydroxide and Bi chloride.

Metal Having a Melting Point Over 2000° C.: 0.1 wt % or Less

The metals added to the cored flux do not substantially contain any metal having a melting point over 2000° C. In the case that a metal having a melting point over 2000° C., such as Mo or W, is contained in the cored flux, the metal is not sufficiently melted even if the metal is subjected to arc heat at the time of welding. Thus, the metal is present as a micro-inclusion in a non-melted or semi-melted state in weld metal, so that the interface between matrixes is brittle and micro-cracks are frequently generated. The microcracks become starting points of pitting corrosion, to lower the pitting corrosion resistance of the weld metal. The wording "the cored flux do not substantially contain any metal having a melting point over 2000° C." means that the content of any inclusion metal having a melting point over 2000° C. is 0.1 wt % or less. Thus, the content of any inclusion metal having a melting point over 2000° C. is limited to 0.1 wt % or less.

The Total Amount of Ni Powder and Fe Powder: 3.0 wt % or Less

In the case that a large amount of Ni powder and Fe powder is contained in the cored flux, in the wire drawing step in the production of the flux cored wire the Ni powder and the Fe powder are stretched as the area of the wire is reduced. In such a wire, a flux pole in welding arc (the extension of a non-melted flux) becomes long, so that the melting of the flux gets uneven. This causes the segregation of the flux components in weld metal and slag contamination. To prevent this, it is necessary that the total amount of the Ni powder and the Fe powder is limited to 3.0 wt % or less. Thus, the total content of the Ni powder and the Fe powder is limited to 3.0 wt % or less.

{Cr}+3.3×{Mo}+16×{N}−150×{Bi}: 33.0–43.0

The parameter A represented by the following equation 1, which is related to Cr, Mo, N and Bi, needs to satisfy the following equation 2.

$$\{Cr\}+3.3\times\{Mo\}+16\times\{N\}-150\times\{Bi\} \quad \text{[Equation 1]}$$

$$33.0 \leq A \leq 43.0 \quad \text{[Equation 2]}$$

If the parameter A is less than 33.0, pitting corrosion resistance deteriorates. On the other hand, if the parameter A is more than 43.0, the sigma phase is precipitated and the wire is made brittle so that the notch toughness of the wire drops. Therefore, the range of the parameter A is set up to 33.0–43.0.

In the present invention, the components of the wire are specified as above in order to obtain a flux cored wire, for welding duplex stainless steel, which is excellent in pitting corrosion resistance. However, in order to improve welding usability (such as slag detachability in a relatively narrow joint, and bead appearance in vertical upward welding and overhead welding), the following are specified: the contents of $TiO_2$, $SiO_2$, $ZrO_2$, $Al_2O_3$ and MgO; the parameter D, which is equal to $\{Al_2O_3\}-20\times\{Bi_2O_3\}$ wherein the content of and $Al_2O_3$ is represented by $\{Al_2O_3\}$ and the content of $Bi_2O_3$ is represented by $\{Bi_2O_3\}$; and the total amount of slag forming components. The following will describe reasons why these are specified.

$TiO_2$: 5.0–8.0 wt %

$TiO_2$ has an effect of improving stability of an arc, stabilizing slag covering of the weld metal, and making the shape of a bead good. If the $TiO_2$ content is less than 5.0 wt %, this effect cannot be sufficiently obtained. On the other hand, if the $TiO_2$ content is more than 8.0 wt %, the fluidity of slag drops and defects of slag contamination are easily generated. In addition, slag detachability deteriorates. Thus, the $TiO_2$ content is set up to 5.0–8.0 wt %.

$SiO_2$: 2–1.2 wt %

$SiO_2$ has an effect of improving wettability of a bead and slag covering. If the $SiO_2$ content is less than 0.2 wt %, this effect cannot be sufficiently obtained. On the other hand, if the $SiO_2$ is more than 1.2 wt %, the viscosity of slag becomes excessive so that the shape of a bead and slag covering deteriorate. Thus, the $SiO_2$ content is set up to 0.2–1.2 wt %.

$ZrO_2$: 1.2–3.3 wt %

$ZrO_2$ has an effect of keeping good viscosity of slag in vertical upward welding and overhead welding to prevent the slag from flowing down, and making the shape of a bead good. If the $ZrO_2$ content is less than 1.2 wt %, this effect cannot be sufficiently obtained. On the other hand, if the $ZrO_2$ content is more than 3.3 wt %, the viscosity of slag becomes too high and the slag covers melted metal excessively so that an arc is not made stable and the defect of slag contamination is easily generated. Thus, the $ZrO_2$ content is set up to 1.2–3.3 wt %.

$Al_2O_3$: 0.50 wt % or Less $Al_2O_3$ has an effect of adjusting the melting point of slag and making the shape of a bead good. However, if the $Al_2O_3$ content is too large, slag detachability deteriorates. Thus, the upper limit of the $Al_2O_3$ content is set up to 0.50 wt %. That is, the $Al_2O_3$ content is set up to 0.50 wt % or less.

MgO: 0.35 wt % or Less

MgO has an effect of adjusting the viscosity and the melting point of slag and improving slag detachability. However, if the MgO content is too large, the amount of spatter increases. Thus, the upper limit of the MgO content is set up to 0.35 wt %. That is, the MgO content is set up to 0.35 wt % or less.

$$\{Al_2O_3\}-20\times\{Bi_2O_3\}: 0-0.35$$

The parameter D represented by the following equation 3, which is related to $Al_2O_3$ and $Bi_2O_3$, needs to satisfy the following equation 4.

$$\{Al_2O_3\}-20\times\{Bi_2O_3\} \quad \text{[Equation 3]}$$

$$0 \leq D \leq 0.35 \quad \text{[Equation 4]}$$

The parameter D is a factor related to adjustment of slag detachability and the shape of a bead. If this parameter becomes negative, the slag detachability is good but weld metal is liable to hang down in vertical upward welding and overhead welding so as to deteriorate the appearance of the bead. On the other hand, if the parameter D is more than 0.35, the appearance of the bead is good but the slag detachability gets worse. Thus, the parameter D is set up to 0–0.35.

Slag Forming Components: A Total Amount of 9.0 to 13.0 wt %

If the total content of slag forming components such as various metal oxides, metal fluorides, and arc stabilizers is less than 9.0 wt %, the amount of slag is too small so that the slag does not cover weld metal uniformly. Thus, the shape of a bead is uneven and external appearance thereof is not uniform. On the other hand, if the total content of the slag forming components is more than 13.0 wt %, the amount of slag becomes too large. For this reason, gas generated when weld metal is solidified is not easily diffused into an arc atmosphere so that pitting corrosion resistance deteriorates. In addition, slag detachability also deteriorates in narrow joints.

In order to obtain a duplex stainless steel welding flux cored wire good in pitting corrosion resistance and welding usability, the components of the wire are specified as above in the present invention. Furthermore, from the viewpoint of enlarging uses, it is demanded that the notch toughness of the duplex stainless steel weld metal is improved. If the Ni content is increased, the notch toughness can be improved. However, from the viewpoint of stabilization of the duplex stainless steel weld metal composed of the ferrite phase and the austenite phase, the increase in the Ni content is restrictive. Thus, the inventors have succeeded in improving the notch toughness while keeping the microstructure of the weld metal by adding one or more of Ti, Mg and Al. The following will describe reasons why the amounts of these elements are limited.

Ti or Fe—Ti Alloy: 1.0 wt % or Less as a Value Converted to Ti

Ti has an effect of reducing the amount of oxygen in weld metal by deoxidization action and making the ferrite phase fine by nucleus generation prompting action in solidification. In order to improve the notch toughness of weld metal by this effect, the Ti content needs to be 1.0 wt % or less as a value converted to Ti. If the Ti content is more than 1.0 wt %, the weld metal is reacted with contained N to produce a Ti nitride. Accordingly, the amount of solved N is reduced so that pitting corrosion resistance unfavorably deteriorates. Therefore, the Ti content is set up to 1.0 wt % or less as a value converted to Ti. Ti may be added in either form of metal Ti or Fe—Ti alloy.

Mg: 1.0 wt % or Less as a Value Converted to Mg

Mg has an effect of reducing the amount of oxygen in weld metal by deoxidization action to improve the notch toughness of weld metal. MgO produced by the deoxidization action becomes a component of slag to improve slag detachability. To obtain these effects, the Mg content needs to be 1.0 wt % or less as a value converted to Mg. If the Mg content is more than 1.0 wt %, the amount of spatter unfavorably increases. Accordingly, the Mg content is set up to 1.0 wt % or less as value converted to Mg. From the viewpoint of yield and safety, Mg is preferably added in the form of Mg alloy such as Al—Mg and Ni—Mg.

Al or Al alloy: 1.0 wt % or Less as a Value Converted to Al

Al has an effect of reducing the amount of oxygen in weld metal by deoxidization action and making the microstructure of the weld metal to improve the notch toughness. $Al_2O_3$ produced by the deoxidization action causes the melting point of slag to be adjusted, to improve the shape of a bead. In order to obtain these effects, the Al content needs to be 1.0 wt % or less as a value converted to Al. If the Al content is more than 1.0 wt %, Al nitride is excessively produced. As a result, the amount of solved N is reduced so that pitting corrosion resistance unfavorably deteriorates. Therefore, the Al content is set up to 1.0 wt % or less as a value converted to Al. Al may be added in either form of metal Al or Al alloy such as Fe—Al or Al—Mg.

In the present invention, various kinds of slag formers and arc stabilizer, besides the above-mentioned components, may be added. The kinds thereof are not restrictive. If necessary, reductants such as Si, Mn and Zr may be added.

As the shell, there may be used austenitic stainless steel or austenitic/ferritic stainless steel. Components of the shell are not limited. There may be used component-systems or compositions defined in JIS G4304: "hot rolled stainless steel plate", JIS G4305: "cold rolled stainless steel plate", JIS G4306: "hot rolled stainless steel plate", and JIS G4304: "cold rolled stainless steel band"; or analogues thereto.

The sectional shape and the wire diameter of the flux cored wire may be various. Welding may be performed according to JIS Z3323 "Stainless steel arc welding flux cored wire". At that time, the component-systems and compositions of shield gas may be suitably used.

EXAMPLES

Figure 2A:
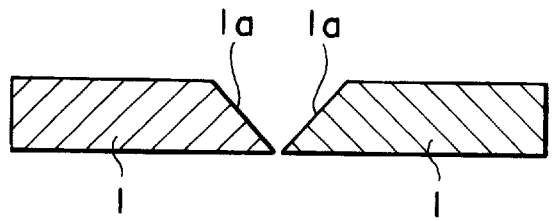
FIG. 2A is a cross section of a joint geometry of a welding parent metal in flat welding.
Figure 2B:
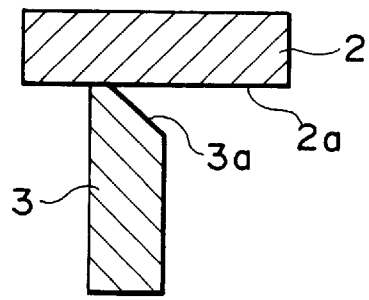
FIG. 2B is a cross section of a joint geometry of a welding parent metal in vertical upward welding and overhead welding.

The following will specifically describe Examples of the duplex stainless steel welding flux cored wire according to the present invention, as compared with Comparative Examples, which are out of the scope of the present invention. FIG. 2A is a cross section illustrating a joint geometry of a welding parent metal in flat welding, and FIG. 2B is a cross section illustrating a joint geometry of a welding parent metal in vertical upward welding and overhead welding.

Shells made of steels shown in Tables 1 and 2 were used to produce flux cored wires. The chemical compositions of the respective wires are shown in Tables 5–13.

Next, using the flux cored wires, a welding parent metal having a chemical composition shown in Table 3 was subjected to flat welding, vertical upward welding, and overhead welding under welding conditions shown in Table 4, and then welding usability of the wires were evaluated. In the flat welding, as shown in FIG. 2A, the end of welding parent metals 1 was formed to have inclined planes 1a, and the welding parent metals 1 were set in the manner that the inclined planes 1a faced each other, and then welding was performed. In the vertical upward welding and the overhead welding, as shown in FIG. 2B, the end of an inclined plane 3a formed at a welding parent metal 3 was brought into contact with a side face 2a of an upper plate 2, and then welding was performed. The evaluation of welding usability is as follows. Very good: ⊚, good: o, and bad: x.

Test pieces were collected from the flat weld metal and were subjected to a pitting corrosion test according to JIS G0578: "$FeCl_3$ corrosion test of stainless steel". In this way, corrosion rates were evaluated. Test pieces having a corrosion reduction of less than 0.1 $g/mm^2$.h, 0.1–0.2 $g/mm^2$.h and not less than 0.2 $g/mm^2$.h were ranked as good, slightly bad, and bad, respectively.

The same weld metal was 3 times subjected to a Charpy impact test at −46° C., and notch toughness was evaluated by the average value of the resultant values. Metals whose the average value were not less than 27 J, and less than 27 J were ranked as good and bad, respectively.

Tables 14 and 15 show the results of the welding usability. Tables 16 and 17 show the results of the pitting corrosion test. Tables 18 and 19 show the results of the Charpy impact test.

The symbol "tr." represents a very small amount.

TABLE 1

| | Chemical components of shells (wt %) | | | | | |
|---|---|---|---|---|---|---|
| Shell symbol | C | Si | Mn | P | S | Cu |
| A | 0.015 | 0.44 | 1.02 | 0.023 | 0.006 | 0.03 |
| B | 0.025 | 0.56 | 1.25 | 0.020 | 0.002 | 0.20 |
| C | 0.015 | 0.37 | 1.17 | 0.021 | 0.005 | 0.07 |

TABLE 2

| | Chemical components of shells (wt %) | | | | |
|---|---|---|---|---|---|
| Shell symbol | Ni | Cr | Mo | Ti | N |
| A | 9.80 | 19.41 | 0.02 | tr. | 0.012 |
| B | 10.03 | 19.01 | 0.30 | tr. | 0.041 |
| C | 9.98 | 19.78 | 0.02 | 0.10 | 0.024 |

TABLE 3

| Chemical components of welding parent metal (wt %) | | | | | | | | | |
|---|---|---|---|---|---|---|---|---|---|
| C | Si | Mn | P | S | Cu | Ni | Cr | Mo | N |
| 0.024 | 0.57 | 0.91 | 0.020 | 0.006 | 0.05 | 6.25 | 22.81 | 2.89 | 0.12 |

TABLE 4

| | Welding conditions | | |
|---|---|---|---|
| Welding position | Flat welding | Vertical upward welding | Overhead welding |
| Torch manipulation method | Weaving | Weaving | Straight |
| Current (A) | 190–210 | 180 | 190 |
| Voltage (V) | 27–29 | 26 | 27 |
| Welding speed (cm/mm) | 25–30 | 7 | 27 |
| Welding heat input (kJ/cm) | 103–14.6 | 40.1 | 11.4 |
| Wire diameter (mm) | 1.2 | 1.2 | 1.2 |
| Polarity | DC-EP | DC-EP | DC-EP |
| Shield gas | 80% Ar–20% $CO_2$ | 80% Ar–20% $CO_2$ | 80% Ar–20% $CO_2$ |
| Wire extension (mm) | 20 | 20 | 20 |

TABLE 5

| | No. | Shell symbol | C | Cr | Mo | N | Bi | Metal Mo | Metal W | Ni powder + Fe powder | A |
|---|---|---|---|---|---|---|---|---|---|---|---|
| Example | 1 | A | 0.03 | 21.5 | 3.8 | 0.25 | 0.010 | tr. | tr. | 1.5 | 36.5 |
| | 2 | A | 0.04 | 22.4 | 3.0 | 0.18 | 0.007 | tr. | tr. | 1.9 | 34.1 |
| | 3 | A | 0.03 | 23.5 | 2.8 | 0.27 | 0.014 | tr. | tr. | 1.0 | 35.0 |
| | 4 | A | 0.02 | 24.8 | 2.6 | 0.09 | 0.010 | tr. | tr. | 2.4 | 33.3 |
| | 5 | A | 0.02 | 25.3 | 2.7 | 0.29 | 0.008 | 0.1 | tr. | 3.0 | 37.7 |
| | 6 | A | 0.04 | 26.0 | 4.0 | 0.25 | 0.002 | tr. | tr. | 2.6 | 42.9 |
| | 7 | A | 0.02 | 21.5 | 3.8 | 0.08 | 0.015 | tr. | tr. | 1.2 | 33.1 |
| | 8 | A | 0.04 | 21.0 | 3.9 | 0.30 | 0.011 | tr. | tr. | 2.9 | 37.0 |
| | 9 | A | 0.02 | 23.5 | 3.3 | 0.19 | 0.012 | tr. | tr. | 1.5 | 35.6 |
| | 10 | B | 0.04 | 22.9 | 2.7 | 0.26 | 0.015 | tr. | 0.1 | 2.3 | 33.7 |
| | 11 | C | 0.03 | 25.1 | 2.8 | 0.10 | 0.008 | tr. | tr. | 2.8 | 34.7 |
| | 12 | B | 0.04 | 22.0 | 3.8 | 0.30 | 0.001 | tr. | tr. | 1.5 | 39.2 |

TABLE 6

| | No. | Shell symbol | C | Cr | Mo | N | Bi | Metal Mo | Metal W | Ni powder + Fe powder | A |
|---|---|---|---|---|---|---|---|---|---|---|---|
| Example | 13 | B | 0.04 | 21.3 | 3.6 | 0.29 | 0.003 | tr. | tr. | 2.2 | 37.4 |
| | 14 | B | 0.04 | 22.5 | 4.0 | 0.24 | 0.005 | tr. | tr. | 1.4 | 38.8 |
| | 15 | B | 0.03 | 21.0 | 3.9 | 0.30 | 0.007 | 0.1 | tr. | 1.9 | 37.6 |
| | 16 | B | 0.03 | 21.8 | 4.0 | 0.27 | 0.011 | tr. | tr. | 3.0 | 37.7 |
| | 17 | C | 0.03 | 25.3 | 2.7 | 0.08 | 0.012 | tr. | tr. | 3.0 | 33.7 |
| | 18 | C | 0.03 | 25.4 | 2.6 | 0.09 | 0.008 | tr. | tr. | 2.4 | 34.2 |
| | 19 | C | 0.03 | 25.1 | 2.5 | 0.08 | 0.004 | tr. | tr. | 1.5 | 34.0 |
| | 20 | A | 0.02 | 25.9 | 3.8 | 0.21 | 0.012 | tr. | tr. | 2.4 | 40.0 |
| | 21 | A | 0.02 | 25.4 | 3.9 | 0.22 | 0.010 | tr. | tr. | 1.5 | 40.3 |
| | 22 | A | 0.02 | 26.0 | 4.0 | 0.25 | 0.011 | tr. | tr. | 2.4 | 41.6 |
| | 23 | A | 0.02 | 25.3 | 3.5 | 0.23 | 0.004 | tr. | tr. | 2.3 | 39.9 |
| | 24 | A | 0.02 | 24.8 | 3.1 | 0.30 | 0.009 | tr. | tr. | 2.0 | 38.5 |
| | 25 | A | 0.03 | 22.6 | 2.8 | 0.28 | 0.010 | tr. | tr. | 2.6 | 34.8 |

TABLE 7

| | No. | Shell symbol | $TiO_2$ | $SiO_2$ | $ZrO_2$ | $Al_2O_3$ | MgO | Value converted to $Bi_2O_3$ | D |
|---|---|---|---|---|---|---|---|---|---|
| Example | 1 | A | 4.0 | 1.2 | 2.2 | 0.42 | 0.34 | 0.011 | 0.20 |
| | 2 | A | 6.5 | 0.1 | 2.2 | 0.12 | 0.29 | 0.008 | −0.04 |
| | 3 | A | 7.2 | 0.9 | 1.0 | 0.23 | 0.11 | 0.016 | −0.09 |
| | 4 | A | 5.0 | 0.2 | 1.2 | 0.60 | 0.20 | 0.011 | 0.38 |
| | 5 | A | 6.9 | 1.0 | 3.1 | 0.47 | 0.55 | 0.009 | 0.29 |
| | 6 | A | 10.0 | 1.0 | 2.1 | 0.37 | 0.35 | 0.002 | 0.33 |
| | 7 | A | 7.0 | 2.2 | 1.3 | 0.46 | 0.25 | 0.017 | 0.12 |
| | 8 | A | 8.0 | 0.4 | 4.3 | 0.50 | 0.08 | 0.012 | 0.26 |
| | 9 | A | 5.5 | 1.2 | 2.4 | 0.35 | 0.26 | 0.013 | 0.09 |
| | 10 | B | 6.2 | 0.9 | 1.9 | 0.39 | 0.34 | 0.017 | 0.05 |
| | 11 | C | 6.0 | 1.0 | 2.3 | 0.30 | 0.32 | 0.009 | 0.12 |
| | 12 | B | 7.9 | 0.8 | 3.2 | 0.24 | 0.19 | 0.001 | 0.22 |

TABLE 8

| | No. | Shell symbol | $TiO_2$ | $SiO_2$ | $ZrO_2$ | $Al_2O_3$ | MgO | Value converted to $Bi_2O_3$ | D |
|---|---|---|---|---|---|---|---|---|---|
| Example | 13 | B | 8.0 | 0.3 | 1.2 | 0.40 | 0.11 | 0.003 | 0.34 |
| | 14 | B | 5.0 | 0.2 | 3.3 | 0.15 | 0.22 | 0.006 | 0.03 |

TABLE 8-continued

| No. | Shell symbol | TiO$_2$ | SiO$_2$ | ZrO$_2$ | Al$_2$O$_3$ | MgO | Value converted to Bi$_2$O$_3$ | D |
|---|---|---|---|---|---|---|---|---|
| 15 | B | 6.2 | 1.4 | 2.4 | 0.47 | 0.35 | 0.008 | 0.31 |
| 16 | B | 7.4 | 1.1 | 1.8 | 0.22 | 0.08 | 0.012 | −0.02 |
| 17 | C | 6.2 | 1.0 | 2.2 | 0.44 | 0.20 | 0.013 | 0.18 |
| 18 | C | 6.3 | 1.5 | 2.6 | 0.43 | 0.21 | 0.009 | 0.25 |
| 19 | C | 6.0 | 1.3 | 2.3 | 0.42 | 0.20 | 0.004 | 0.34 |
| 20 | A | 7.2 | 1.0 | 1.3 | 0.25 | 0.20 | 0.013 | −0.01 |
| 21 | A | 7.6 | 1.2 | 1.2 | 0.23 | 0.30 | 0.011 | 0.01 |
| 22 | A | 7.1 | 1.0 | 1.5 | 0.22 | 0.29 | 0.012 | −0.02 |
| 23 | A | 7.5 | 1.4 | 1.2 | 0.24 | 0.24 | 0.004 | 0.16 |
| 24 | A | 7.0 | 1.1 | 1.3 | 0.20 | 0.34 | 0.010 | 0.00 |
| 25 | A | 8.9 | 1.7 | 1.0 | 0.72 | 0.41 | 0.011 | 0.50 |

TABLE 9

| | No. | Shell symbol | Slag forming component | value converted to Ti | value converted to Mg | value converted to Al |
|---|---|---|---|---|---|---|
| Example | 1 | A | 8.7 | tr. | tr. | tr. |
| | 2 | A | 9.7 | tr | tr. | tr. |
| | 3 | A | 9.9 | tr. | tr. | tr. |
| | 4 | A | 7.7 | tr. | tr. | tr. |
| | 5 | A | 12.5 | tr. | tr. | tr. |
| | 6 | A | 14.3 | tr. | tr. | tr. |
| | 7 | A | 11.7 | tr. | tr. | tr. |
| | 8 | A | 13.8 | tr. | tr. | tr. |
| | 9 | A | 10.2 | tr. | tr. | tr. |
| | 10 | B | 10.2 | tr. | tr. | tr. |
| | 11 | C | 10.4 | 0.06 | tr. | tr. |
| | 12 | B | 12.8 | tr. | tr. | tr. |

TABLE 10

| | No. | Shell symbol | Slag forming component | value converted to Ti | value converted to Mg | value converted to Al |
|---|---|---|---|---|---|---|
| Example | 13 | B | 10.5 | tr. | tr. | tr. |
| | 14 | B | 9.4 | tr. | tr. | tr. |
| | 15 | B | 11.3 | tr. | tr. | tr. |
| | 16 | B | 11.1 | tr. | tr. | tr. |
| | 17 | C | 10.5 | 0.7 | 0.2 | tr. |
| | 18 | C | 11.5 | 0.4 | tr. | tr. |
| | 19 | C | 10.7 | 0.2 | 0.5 | 0.3 |
| | 20 | A | 10.6 | tr. | 0.8 | 0.2 |
| | 21 | A | 11.0 | 0.4 | tr. | 0.6 |
| | 22 | A | 10.6 | 0.3 | 0.7 | tr. |
| | 23 | A | 11.1 | tr. | 1.0 | tr. |
| | 24 | A | 10.4 | tr. | tr. | 1.0 |
| | 25 | A | 13.2 | tr. | tr. | tr. |

TABLE 11

| | No. | Shell symbol | C | Cr | Mo | N | Bi | Metal Mo | Metal W | Ni powder + Fe powder | A |
|---|---|---|---|---|---|---|---|---|---|---|---|
| Comparative | 26 | B | 0.05 | 23.4 | 3.2 | 0.26 | 0.015 | tr. | tr. | 2.5 | 35.9 |
| Example | 27 | A | 0.03 | 20.0 | 3.9 | 0.09 | 0.003 | tr. | tr. | 1.8 | 33.9 |

TABLE 11-continued

| | | | | | Chemical component (wt %) | | | | | |
|---|---|---|---|---|---|---|---|---|---|---|
| No. | Shell symbol | C | Cr | Mo | N | Bi | Metal Mo | Metal W | Ni powder + Fe powder | A |
| 28 | A | 0.03 | 24.7 | 2.4 | 0.10 | 0.005 | tr. | tr. | 1.7 | 33.5 |
| 29 | A | 0.02 | 25.1 | 3.3 | 0.05 | 0.008 | tr. | tr. | 1.6 | 35.6 |
| 30 | A | 0.02 | 27.8 | 2.7 | 0.30 | 0.015 | tr. | tr. | 1.5 | 39.3 |
| 31 | A | 0.03 | 24.5 | 5.0 | 0.25 | 0.014 | tr. | tr. | 1.2 | 42.9 |
| 32 | A | 0.03 | 23.8 | 3.4 | 0.42 | 0.004 | tr. | tr. | 1.7 | 41.1 |
| 33 | A | 0.02 | 22.8 | 3.1 | 0.21 | 0.021 | tr. | tr. | 1.6 | 33.2 |
| 34 | A | 0.02 | 21.6 | 2.6 | 0.08 | 0.013 | tr. | tr. | 1.5 | 29.5 |
| 35 | A | 0.03 | 25.9 | 4.0 | 0.28 | 0.001 | tr. | tr. | 1.3 | 43.4 |
| 36 | A | 0.02 | 24.3 | 3.1 | 0.21 | 0.010 | 0.3 | tr. | 1.6 | 36.4 |
| 37 | A | 0.02 | 25.6 | 3.7 | 0.22 | 0.009 | tr. | 0.3 | 1.5 | 40.0 |
| 38 | A | 0.02 | 24.9 | 3.0 | 0.22 | 0.011 | tr. | tr. | 4.6 | 36.7 |
| 39 | A | 0.04 | 23.4 | 2.8 | 0.21 | 0.008 | tr. | tr. | 2.4 | 34.8 |
| 40 | A | 0.04 | 23.8 | 2.7 | 0.25 | 0.006 | tr. | tr. | 2.6 | 35.8 |
| 41 | A | 0.04 | 23.6 | 2.9 | 0.23 | 0.007 | tr. | tr. | 2.3 | 35.8 |

TABLE 12

| | | | Chemical components (wt %) | | | | | | |
|---|---|---|---|---|---|---|---|---|---|
| | No. | Shell symbol | $TiO_2$ | $SiO_2$ | $ZrO_2$ | $Al_2O_3$ | MgO | Value converted to $Bi_2O_3$ | D |
| Comparative Example | 26 | B | 6.7 | 1.2 | 2.2 | 0.35 | 0.25 | 0.017 | 0.01 |
| | 27 | A | 6.2 | 1.3 | 2.3 | 0.32 | 0.21 | 0.003 | 0.26 |
| | 28 | A | 6.3 | 1.0 | 2.0 | 0.32 | 0.26 | 0.006 | 0.20 |
| | 29 | A | 6.4 | 1.1 | 2.3 | 0.30 | 0.24 | 0.009 | 0.12 |
| | 30 | A | 6.0 | 1.1 | 2.2 | 0.35 | 0.23 | 0.017 | 0.01 |
| | 31 | A | 6.6 | 1.2 | 2.1 | 0.36 | 0.22 | 0.016 | 0.04 |
| | 32 | A | 6.2 | 1.3 | 2.5 | 0.33 | 0.21 | 0.004 | 0.25 |
| | 33 | A | 6.3 | 1.4 | 2.3 | 0.42 | 0.25 | 0.023 | −0.04 |
| | 34 | A | 6.1 | 1.3 | 2.8 | 0.29 | 0.24 | 0.014 | 0.01 |
| | 35 | A | 6.4 | 1.0 | 2.7 | 0.28 | 0.23 | 0.001 | 0.26 |
| | 36 | A | 6.8 | 1.5 | 2.2 | 0.26 | 0.24 | 0.011 | 0.04 |
| | 37 | A | 6.0 | 1.2 | 2.1 | 0.30 | 0.24 | 0.010 | 0.10 |
| | 38 | A | 6.1 | 1.3 | 2.2 | 0.29 | 0.21 | 0.012 | 0.05 |
| | 39 | A | 7.0 | 0.8 | 2.3 | 0.35 | 0.22 | 0.009 | 0.17 |
| | 40 | A | 6.8 | 1.0 | 2.4 | 0.33 | 0.20 | 0.007 | 0.19 |
| | 41 | A | 6.6 | 0.7 | 2.4 | 0.36 | 0.22 | 0.008 | 0.20 |

TABLE 13

| | | | Chemical components (wt %) | | | |
|---|---|---|---|---|---|---|
| | No. | Shell symbol | Slag forming component | value converted to Ti | value converted to Mg | value converted to Al |
| Example | 26 | B | 11.2 | tr. | tr. | tr. |
| | 27 | A | 10.8 | tr. | tr. | tr. |
| | 28 | A | 10.4 | tr. | tr. | tr. |
| | 29 | A | 10.8 | tr. | tr. | tr. |
| | 30 | A | 10.4 | tr. | tr. | tr. |
| | 31 | A | 11.0 | tr. | tr. | tr. |
| | 32 | A | 11.0 | tr. | tr. | tr. |
| | 33 | A | 11.2 | tr. | tr. | tr. |
| | 34 | A | 11.2 | tr. | tr. | tr. |
| | 35 | A | 11.1 | tr. | tr. | tr. |
| | 36 | A | 11.5 | tr. | tr. | tr. |
| | 37 | A | 10.3 | tr. | tr. | tr. |
| | 38 | A | 10.6 | tr. | tr. | tr. |
| | 39 | A | 11.2 | 1.8 | tr. | tr. |
| | 40 | A | 11.2 | tr. | 2.3 | tr. |
| | 41 | A | 10.8 | tr. | tr. | 2.1 |

TABLE 14

Evaluation results of welding usability

| | No. | Arc stability | Amount of generated spatter | Slag detachability | slag covering | appearance and shape of beads |
|---|---|---|---|---|---|---|
| Example | 1 | ○ | ◎ | ◎ | ○ | ○ |
| | 2 | ◎ | ◎ | ◎ | ○ | ○ |
| | 3 | ◎ | ◎ | ○ | ◎ | ○ |
| | 4 | ◎ | ◎ | ◎ | ◎ | ○ |
| | 5 | ◎ | ○ | ◎ | ◎ | ◎ |
| | 6 | ◎ | ◎ | ○ | ◎ | ○ |
| | 7 | ◎ | ◎ | ○ | ◎ | ○ |
| | 8 | ○ | ◎ | ◎ | ◎ | ○ |
| | 9 | ◎ | ◎ | ◎ | ◎ | ◎ |
| | 10 | ◎ | ◎ | ◎ | ◎ | ◎ |
| | 11 | ◎ | ◎ | ◎ | ◎ | ◎ |
| | 12 | ◎ | ◎ | ◎ | ◎ | ◎ |
| | 13 | ◎ | ◎ | ◎ | ◎ | ◎ |
| | 14 | ◎ | ◎ | ◎ | ◎ | ◎ |
| | 15 | ◎ | ◎ | ○ | ◎ | ○ |
| | 16 | ◎ | ◎ | ○ | ◎ | ○ |
| | 17 | ◎ | ◎ | ◎ | ◎ | ◎ |
| | 18 | ◎ | ◎ | ○ | ◎ | ○ |
| | 19 | ◎ | ◎ | ○ | ◎ | ○ |
| | 20 | ◎ | ◎ | ◎ | ◎ | ○ |
| | 21 | ◎ | ◎ | ◎ | ◎ | ◎ |
| | 22 | ◎ | ◎ | ◎ | ◎ | ○ |
| | 23 | ◎ | ◎ | ○ | ◎ | ○ |
| | 24 | ◎ | ◎ | ◎ | ◎ | ◎ |
| | 25 | ◎ | ○ | ○ | ○ | ○ |

TABLE 15

Evaluation results of welding usability

| | No. | Arc stability | Amount of generated spatter | Slag detachability | slag covering | appearance and shape of beads |
|---|---|---|---|---|---|---|
| Comparative Example | 26 | ◎ | × | ◎ | ◎ | ◎ |
| | 27 | ◎ | ◎ | ○ | ◎ | ○ |
| | 28 | ◎ | ◎ | ◎ | ◎ | ◎ |
| | 29 | ◎ | ◎ | ◎ | ◎ | ◎ |
| | 30 | ◎ | ◎ | ◎ | ◎ | ◎ |
| | 31 | ◎ | ◎ | ◎ | ◎ | ◎ |
| | 32 | ◎ | ◎ | ○ | ◎ | × (Occurrence of blowholes) |
| | 33 | ◎ | ◎ | ◎ | ◎ | ○ |
| | 34 | ◎ | ◎ | ○ | ◎ | ○ |
| | 35 | ◎ | ◎ | ◎ | ◎ | ◎ |
| | 36 | ◎ | ◎ | ○ | ◎ | ○ |
| | 37 | ◎ | ◎ | ◎ | ◎ | ◎ |
| | 38 | ◎ | ◎ | ○ | ◎ | × (Occurrence of slag contamination) |
| | 39 | ◎ | ◎ | ◎ | ◎ | ◎ |
| | 40 | ◎ | × | ◎ | ◎ | ◎ |
| | 41 | ◎ | ◎ | ◎ | ◎ | ◎ |

TABLE 16

Results of pitting corrosion test of welding metals

| | No. | Corrosion reduction ($g/mm^2 \cdot h$) | Evaluation |
|---|---|---|---|
| Example | 1 | 0.03 | Good |
| | 2 | 0.02 | Good |

TABLE 16-continued

Results of pitting corrosion test of welding metals

| No. | Corrosion reduction ($g/mm^2 \cdot h$) | Evaluation |
|---|---|---|
| 3 | 0.06 | Good |
| 4 | 0.04 | Good |
| 5 | 0.03 | Good |
| 6 | 0.01 | Good |
| 7 | 0.07 | Good |
| 8 | 0.02 | Good |
| 9 | 0.02 | Good |
| 10 | 0.06 | Good |
| 11 | 0.01 | Good |
| 12 | 0.00 | Good |
| 13 | 0.01 | Good |
| 14 | 0.02 | Good |
| 15 | 0.01 | Good |
| 16 | 0.02 | Good |
| 17 | 0.03 | Good |
| 18 | 0.04 | Good |
| 19 | 0.01 | Good |
| 20 | 0.04 | Good |
| 21 | 0.02 | Good |
| 22 | 0.03 | Good |
| 23 | 0.01 | Good |
| 24 | 0.02 | Good |
| 25 | 0.03 | Good |

TABLE 17

Results of pitting corrosion test of welding metals

| | No. | Corrosion reduction ($g/mm^2 \cdot h$) | Evaluation |
|---|---|---|---|
| Comparative Example | 26 | 0.12 | Slightly bad |
| | 27 | 0.11 | Slightly bad |
| | 28 | 0.11 | Slightly bad |
| | 29 | 0.14 | Slightly bad |
| | 30 | 0.06 | Good |
| | 31 | 0.07 | Good |
| | 32 | 0.00 | Good |
| | 33 | 0.22 | Bad |
| | 34 | 0.16 | Slightly bad |
| | 35 | 0.00 | Good |
| | 36 | 0.10 | Slightly bad |
| | 37 | 0.11 | Slightly bad |
| | 38 | 0.06 | Good |
| | 39 | 0.15 | Slightly bad |
| | 40 | 0.02 | Good |
| | 41 | 0.17 | Slightly bad |

TABLE 18

Results of Charpy impact test of welding metal

| | No. | Absorbed energy (J) | Evaluation |
|---|---|---|---|
| Example | 1 | 35 | Good |
| | 2 | 34 | Good |
| | 3 | 40 | Good |
| | 4 | 40 | Good |
| | 5 | 32 | Good |
| | 6 | 38 | Good |
| | 7 | 30 | Good |
| | 8 | 33 | Good |
| | 9 | 32 | Good |
| | 10 | 34 | Good |
| | 11 | 48 | Good |

TABLE 18-continued

Results of Charpy impact test of welding metal

| No. | Absorbed energy (J) | Evaluation |
| --- | --- | --- |
| 12 | 44 | Good |
| 13 | 40 | Good |
| 14 | 40 | Good |
| 15 | 38 | Good |
| 16 | 32 | Good |
| 17 | 58 | Good |
| 18 | 60 | Good |
| 19 | 62 | Good |
| 20 | 55 | Good |
| 21 | 52 | Good |
| 22 | 58 | Good |
| 23 | 66 | Good |
| 24 | 61 | Good |
| 25 | 36 | Good |

TABLE 19

Results of Charpy impact test of welding metal

|  | No. | Absorbed energy (J) | Evaluation |
| --- | --- | --- | --- |
| Example | 26 | 30 | Good |
|  | 27 | 30 | Good |
|  | 28 | 32 | Good |
|  | 29 | 28 | Good |
|  | 30 | 15 | Bad |
|  | 31 | 10 | Bad |
|  | 32 | 18 | Bad |
|  | 33 | 13 | Bad |
|  | 34 | 36 | Good |
|  | 35 | 12 | Bad |
|  | 36 | 16 | Bad |
|  | 37 | 15 | Bad |
|  | 38 | 30 | Good |
|  | 39 | 28 | Good |
|  | 40 | 34 | Good |
|  | 41 | 30 | Good |

As shown in Tables 14–19, all wires of Examples 1–25, which were within the scope of the present invention, exhibited good results. In particular, Examples 9, 14, 17, 21 and 24, which satisfied the requirement of claim 2 of the present invention, exhibited very good welding usability.

As shown in Table 16, the wires of Examples 17, 21 and 24, which were within the scope defined in claims 1–3 of the present invention, exhibited small corrosion reductions, that is, good pitting corrosion resistance in the pitting corrosion test of the weld metals.

As shown in Table 18, all wires of Examples 17, 21 and 24, which were within the scope defined in claims 1–3 of the present invention, and Examples 9, 14, 17, 21 and 24, which were within the scope of claims 1 and 2 of the present invention, exhibited good absorption energies in the Charpy impact test of the weld metals. In particular, the wires of Examples 17, 21 and 24 exhibited very good absorption energy values since the wire contained a large amount of Ti, Mg or Al.

On the other hand, Comparative Examples 26–41, which were out of the scope of the present invention, the following results were obtained.

In the wire of Comparative Example 26, the amount of produced spatter was large so that the result of the welding usability was bad because the C content was over the range defined in claim 1 of the present invention.

In the wire of Comparative Example 27, its corrosion reduction was relatively large and its pitting corrosion resistance was slightly bad because the Cr content was less than the range defined in claim 1 of the present invention.

In the wire of Comparative Example 28, its corrosion reduction was relatively large and its pitting corrosion resistance was slightly bad because the Mo content was less than the range defined in claim 1 of the present invention.

In the wire of Comparative Example 29, its corrosion reduction was relatively large and its pitting corrosion resistance was slightly bad because the N content was less than the range defined in claim 1 of the present invention.

In the wire of Comparative Example 30, the sigma phase was precipitated to exhibit a low absorption energy value because the Cr content was over the range defined in claim 1 of the present invention.

In the wire of Comparative Example 31, the sigma phase was precipitated to exhibit a low absorption energy value because the Mo content was over the range defined in claim 1 of the present invention.

In the wire of Comparative Example 32, blowholes were generated in the weld metal and the weld metal was bad because the N content was over the range defined in claim 1 of the present invention. Paying attention only to the results of the pitting corrosion test, its corrosion reduction was a little to exhibit good pitting corrosion resistance.

In the wire of Comparative Example 33, its pitting corrosion resistance was bad because the Bi content was over the range defined in claim 1 of the present invention.

In the wire of Comparative Example 34, its pitting corrosion resistance was slightly bad because the parameter A did not satisfy the range defined in claim 1 of the present invention.

In the wire of Comparative Example 35, the sigma phase was precipitated to exhibit a low absorption energy value because the parameter A was over the range defined in claim 1 of the present invention.

In the wire of Comparative Example 36, microsegregation was generated to exhibit slightly bad pitting corrosion resistance because the content of Mo, which was a high-melting point metal having a melting point over 2000° C., was over the range defined in claim 3 of the present invention.

In the wire of Comparative Example 37, microsegregation was generated to exhibit slightly bad pitting corrosion resistance because the content of W, which was a high-melting point metal having a melting point over 2000° C., was over the range defined in claim 3 of the present invention.

In the wire of Comparative Example 38, the defect of slag contamination was generated because the content of the Ni powder and the Fe powder did not satisfy the range defined in claim 1 of the present invention. Thus, the wire was bad.

In the wire of Comparative Example 39, its pitting corrosion resistance was slightly bad because the Ti content, as a value converted to Ti, was over the range defined in claim 3 of the present invention.

In the wire of Comparative Example 40, the amount of produced spatter was large because the Mg content, as a value converted to Mg, was over the range defined in claim 3 of the present invention.

In the wire of Comparative Example 41, its pitting corrosion resistance was slightly bad because the Al content, as a value converted to Al, was over the range defined in claim 3 of the present invention.

What is claimed is:

1. A flux cored wire for welding duplex stainless steel, comprising a shell cored with a flux, wherein the total of the shell and the flux comprises MgO, Cr, Mo and N in amounts of 0.08–0.35 wt %, 21.0–26.0 wt %, 2.6–4.0 wt % and 0.08–0.30 wt %, respectively, of the total weight of the wire;

the amounts of C and Bi in said wire and a metal having a melting point over 2000° C. in said flux are 0.04 wt % or less, 0.015 wt % or less, and 0.1 wt % or less, respectively, of the total weight of the wire;

the total amount of Ni powder and Fe powder in said flux is 3.0 wt % or less of the total weight of the wire; and a parameter A represented by $\{Cr\}+3.3\times\{Mo\}+16\times\{N\}-150\times\{Bi\}$, where $\{Cr\}$, $\{Mo\}$, $\{N\}$ and $\{Bi\}$ represent the contents of Cr, Mo, N and Bi, respectively, is from 33.0 to 43.0 wt % of the total weight of the wire.

2. The flux cored wire for welding duplex stainless steel according to claim 1, wherein the total of the shell and the flux comprises $TiO_2$, $SiO_2$, $ZrO_2$, $Al_2O_3$ and MgO in amounts of 5.0–8.0 wt %, 0.2–1.2 wt %, 1.2–3.3 wt %, 0.50 wt % or less, and 0.08–0.35 wt %, respectively, of the total weight of the wire;

a parameter D represented by $\{Al_2O_3\}-20\times\{Bi_2O_3\}$, where $\{Al_2O_3\}$ and $\{Bi_2O_3\}$ represent the contents of $Al_2O_3$ and $Bi_2O_3$, respectively, is from 0 to 0.35 wt % of the total weight of the wire; and the total amount of the slag forming components is from 9.0 to 13.0 wt % of the total weight of the wire.

3. The fluxed cored wire for welding duplex stainless steel according to claim 2, wherein the total of the shell and the flux comprises, of the total weight of the wire, 1 wt % or less of one or more selected from the group consisting of Ti or Fe—Ti alloy: 1.0 wt % or less as a value converted to Ti; Mg alloy: 1.0 wt % or less as a value converted to Mg; and Al or Al alloy: 1.0 wt % or less as a value converted to Al.

4. A method of making a flux cored wire, the method comprising introducing a flux into the core of a steel shell; and producing the flux cored wire of claim 1.

* * * * *